US007725592B1

(12) United States Patent
Hasegawa et al.

(10) Patent No.: US 7,725,592 B1
(45) Date of Patent: May 25, 2010

(54) COMMUNICATION SYSTEM HAVING SERVICE HAND-OFF FUNCTION, USER TERMINAL DEVICE, TRANSMISSION DESTINATION TERMINAL DEVICE, AND PROXY SERVER DEVICE

(75) Inventors: Mikio Hasegawa, Tokyo (JP); Hiroyuki Morikawa, Tokyo (JP); Masugi Inoue, Tokyo (JP); Udana Bandara, Tokyo (JP); Homare Murakami, Tokyo (JP); Khaled Mahmud, Tokyo (JP)

(73) Assignee: National Institute of Information and Communication Technology, Tokyo (JP)

( * ) Notice: Subject to any disclaimer, the term of this patent is extended or adjusted under 35 U.S.C. 154(b) by 689 days.

(21) Appl. No.: 10/547,609

(22) PCT Filed: Feb. 19, 2004

(86) PCT No.: PCT/JP2004/001870

§ 371 (c)(1),
(2), (4) Date: May 8, 2006

(87) PCT Pub. No.: WO2004/080010

PCT Pub. Date: Sep. 16, 2004

(30) Foreign Application Priority Data

Mar. 3, 2003 (JP) .............................. 2003-056281

(51) Int. Cl.
*G06F 15/16* (2006.01)
(52) U.S. Cl. ...................... 709/231; 709/230; 709/232; 709/227; 709/239; 709/244; 370/465; 370/466; 370/467
(58) Field of Classification Search ......... 370/328–333, 370/350–357
See application file for complete search history.

(56) References Cited

U.S. PATENT DOCUMENTS 6,137,783 A * 10/2000 Sallberg ...................... 370/316
6,732,177 B1 * 5/2004 Roy ............................ 370/331

(Continued)

FOREIGN PATENT DOCUMENTS

EP           1085 774 A2      3/2001

(Continued)

OTHER PUBLICATIONS

U.S. Appl. No. 60/154,212, Radkia R. Roy.

(Continued)

*Primary Examiner*—Lester Kincaid
*Assistant Examiner*—Mehmood B Khan
(74) *Attorney, Agent, or Firm*—Sampson & Associates, P.C.

(57) ABSTRACT

It is an object of the present invention to provide a communication system to provide a communication system which requires no special application for a correspondent node and has a service handoff function enabling a transfer destination terminal device to be freely used, and its configuration equipment.

In order to realize this, the communication system includes a correspondent node delivering communication data which can be executed by a predetermined application, a proxy server device which receives the communication data from the node to execute the application, and transfers the service to a transfer destination terminal device, the transfer destination terminal device outputting the service, and a user terminal device, wherein the user terminal device transmits control information to the proxy server device, and thereby the proxy server device switches the transfer destination terminal device to perform service handoff.

17 Claims, 14 Drawing Sheets

U.S. PATENT DOCUMENTS

| | | |
|---|---|---|
| 6,775,255 B1 | 8/2004 | Roy |
| 6,859,448 B1 | 2/2005 | Roy |
| 6,947,432 B2 | 9/2005 | Roy |

FOREIGN PATENT DOCUMENTS

| | | |
|---|---|---|
| JP | 2001-148880 A1 | 5/2001 |

OTHER PUBLICATIONS

Yoko Kikuta, Kenji Sakamoto, Tsutomu Yokoyama, Kenichi Yamazaki, and Masami Yabusaki; "Resource-aware seamless service architecture;" The Institute of Electronics; Information and Communication Engineers; pp. 93-98; vol. 101, No. 194,NS2001-76, RCS2001-77(2001-07);USA.

Todd D. Hodes, and Randy H. Katz; "Composable Ad hoc Location-based Services for Heterogeneous Mobile Client;" Computer Science Division, University of California Berkeley, pp. 1-16; May 5, 1998; USA.

Kunitake Kaneko, Hiroyuki Morikawa, Tomonori Aoyama and Masaya Nakayama; "End-to-End Mobility Support for Heterogeneous Internet Environments;" School of Engineering, The University of Tokyo; 6 Pages; Tokyo, Japan.

Kunitake Kaneko, Yusuke Kochi, Hiroyuki Morikawa, Tomonori Aoyama and Masaya Nakayama; "Implementation and Evaluation of End-to-End Mobility Support at the Session Layer;" School of Engineering, The University of Tokyo; 6 Pages; Tokyo, Japan, 2002.

Ken Ohta, Tomohiro Nakagawa, Yoshinori Isoda, and Toshiaki Sugimura; "Adaptive Mobile Terminal Architecture for Seamless Service;" Multimedia Laboratories, NTT DoCoMo, Inc.; 2001; pp. 301-306; Japan.

Barry Brumitt, Brian Meyers, John Krumm, Amanda Kern, and Steven Shafer; "EasyLiving: Technologies for Intelligent Environments;" pp. 1-12; USA, 2000.

David A. Maltz and Pravin Bhagwat; "MSOCKS: An Architecture for Transport Layer Mobility;" IEEE; 1998; pp. 1037-1045; USA.

Mema Roussopoulos, Petros Maniatis, Edward Swierk, Kevin Lai, Guido Appenzeller and Mary Baker; "Person-Level Routing in the Mobile People Architecture;" The Usenix Association; Proceedings of USITS'99: The 2nd USENIX Symposium on Internet Technologies & Systems; 13 Pages; Oct. 11-14, 1999; Boulder, Co.; USA.

Bhaskaran Raman; Randy H. Katz, and Anthony D. Joseph; "Universal Inbox: Providing Extensible Personal Mobility and Service Mobility in an Integrated Communication Network;" IEEE; 2000; pp. 95-106; USA.

Minoru Katayama; Koichi Takasugi; Minoru Kubota; and Ichizou Kogiku; "A method of Achieving Service Continuity between Different Netowork;" 2001; pp. 452-460 ; B vol.J84 B No. 3.

Robert Di Benedetto; "DirectPlay 8;" Microsoft DirectX Developer Center; www.microsoft.com/japan/msdn/directx/techart/dp8ovrview.asp; May 2001; 12 Pages; Microsoft Corporation.

\* cited by examiner

| Item | Description | Classification |
|---|---|---|
| Terminal Distance | Give Priority to Terminal Closer to Control Terminal | Comparison |
| Screen | Preferentially Select Terminal with Screen Equipment | Selection |
| Speaker | Preferentially Select Terminal with Speaker Equipment | Selection |

8102 — Terminal Distance
8104 — Screen
8106 — Speaker

COMMUNICATION SYSTEM HAVING SERVICE HAND-OFF FUNCTION, USER TERMINAL DEVICE, TRANSMISSION DESTINATION TERMINAL DEVICE, AND PROXY SERVER DEVICE

BACKGROUND OF THE INVENTION

1. Field of the Invention

The present invention relates to a communication system having a service handoff function, and a user terminal device, transfer destination terminal device and a proxy server device for configuring the communication system.

2. Description of the Related Art

In recent years, various forms of ubiquitous computing environments, in which a computer can be utilized everywhere without being conscious of using the computer, have been considered.

For example, places or facilities called hot spots, where network connection from information equipment owned by a user is enabled even if the user is out, have already been put in practical use, and in such places, connection services utilizing wireless LAN or the like are provided. Furthermore, coffee shops, special shops, etc. where terminals connected to the Internet are set up are opened on a global basis, and can be utilized with ease.

Not limited to the above-described cases, if the user can freely utilize many devices that exist here and there in the neighborhood, such as a computer at a place where the user goes out, the user can receive various communications and services flexibly. In order to utilize the nearby devices, there needs a technique by which the devices are discovered and an optimal one is selected to receive a target service through the device.

For example, there are a PDA and a portable telephone as a portable terminal that a user can carry, which have been rapidly enhanced in performance in recent years, so that e-mail exchanges, WEB browsing and the like are enabled. However, wireless networks utilized by the portable terminal are far less stable and their communication bands are smaller in comparison with connection through wired networks. Moreover, as compared with a fixed terminal whose power source is connected, a portable terminal has processing capacity limited to a lower level due to its size and electric power saving, and has only small-sized simple user interface mounted. Its display ability cannot compare with that of the fixed terminal connected to a large screen display.

Consequently, in order that highly functional devices in the neighborhood can also be freely utilized instead of depending on such portable terminals only, various architectures as described in Publicly Known Literatures 1 to 4 have been proposed.

As related art techniques, there are proposed two architectures: architecture using a proxy and end-to-end type architecture.

Such an end-to-end type architecture as described in Publicly Known Literature 2 is well-known, in which a communication application for executing handoff between terminals is also installed in a correspondent node performing delivery to provide end-to-end mobility support.

Therefore, it is impossible that an existing communication application other than the above-described communication application is handed over between terminals, that the handoff between terminals is executed in communication with a correspondent node which does not have the application for handoff, or the like.

Furthermore, as proxy type architecture, there is proposed Medler in Publicly Known Literature 5, MSOCKS in Publicly Known Literature 6, or the like. However, these do not support seamless handover between terminals.

Furthermore, although MPA proposed in Publicly Known Literature 7, and Universal Inbox of Publicly Known Literature 8 realize an architecture which enables an optimal device for receiving to be selected adaptably, these have not realized seamless device switching, either.

As a method in which the handoff between devices with a proxy type configuration is realized, there is proposed a method (Publicly Known Literature 9) in which an interface such as a display of a portable telephone is transferred to a nearby device, thereby succeeding in solving the insufficiency in user interface of a portable terminal.

However, the solution of the problem with the insufficiency in processing capacity of the portable terminal has not been realized, yet.

SUMMARY OF THE INVENTION

The present invention is made in light of the above-described problems of the related art, and it is an object of the present invention to provide a communication system which requires no special application for a correspondent node and has a service handoff function enabling a transfer destination terminal device to be freely used, and its component equipment.

Namely, according to a first aspect of the present invention, there is provided a communication system in which, in accordance with control information from a user terminal device, a service can be received while being handed off to a desired transfer destination terminal device, the communication system comprising a correspondent node delivering communication data which can be executed by a predetermined application, a proxy server device which receives the communication data while holding a session with the correspondent node and executes the application, and further transfers the service provided by the application to the transfer destination terminal device, the transfer destination terminal device capable of outputting at least part of the service transferred from the proxy server device, and the user terminal device which can be carried by a user.

In addition, the communication system is characterized in that the user terminal device transmits the control information to the proxy server device, and based on the control information, the proxy server device switches the transfer destination terminal device providing the service to perform service handoff.

According to a second aspect of the present invention, there is provided a configuration in which the proxy server device can also transfer the service provided by the application to the user terminal device, and the user terminal device can output at least part of the service transferred from the proxy server device.

According to a third aspect of the present invention, there can be provided a configuration in which the user terminal device comprises a user authentication section transmitting user authentication information, and the proxy server device has a user management section performing user management based on the user authentication information.

According to a fourth aspect of the present invention, there is provided a configuration in which the user terminal device comprises the user authentication section transmitting the user authentication information, the proxy server device comprises a user authentication transfer section which sends the user authentication information to the transfer destination terminal device to request user authentication, and sends back the authentication result to the user terminal device, and the transfer destination terminal device has a user management section which performs user management based on the user authentication information, and replies the authentication result to the proxy server device.

According to a fifth aspect of the present invention, the user terminal device can comprise a transfer destination terminal device designating section enabling the user to designate the transfer destination terminal device, and transmit the control information according to the designation in the transfer destination terminal device designating section.

According to a sixth aspect of the present invention, there is provided a configuration in which the user terminal device comprises a transfer destination terminal device selecting section which automatically selects the transfer destination terminal device, based on transfer destination terminal device selection information, and transmits the control information according to the selection in the transfer destination terminal device selecting section.

According to a seventh aspect of the present invention, the user terminal device can comprise a distance detection section detecting a distance to the transfer destination terminal device, and uses the detection result of the distance detection section as the transfer destination terminal device selection information.

Furthermore, according to an eighth aspect of the present invention, the transfer destination terminal device can comprise a terminal-specific information sending section which sends performance information of a network line of the relevant device with the proxy server and/or hardware information of the relevant device, and the user terminal device can receive the terminal-specific information from the terminal-specific information sending section, and use the terminal-specific information as the transfer destination terminal device selection information. At this time, there may be employed a configuration in which the terminal-specific information is received via the proxy server.

According to the present invention, there can be provided a user terminal device in a communication system comprising a correspondent node delivering communication data which can be executed by a predetermined application, a proxy server device which receives the communication data while holding a session with the correspondent node and executes the application, and further transfers a service provided by the application to a transfer destination terminal device, and the transfer destination terminal device capable of outputting at least part of the service transferred from the proxy server device.

According to a ninth aspect of the present invention, there is provided a configuration in which the user terminal device comprises a control information transmitting section which transmits to the proxy server device control information for allowing the proxy server device to switch the transfer destination terminal device providing the service and perform service handoff.

According to a tenth aspect of the present invention, there is provided a configuration in which the user terminal device can output at least part of the service transferred from the proxy server device.

Furthermore, according to an eleventh aspect of the present invention, there can be provided a configuration in which the user terminal device comprises a user authentication section transmitting user authentication information.

Moreover, according to a twelfth aspect of the present invention, the user terminal device can comprise a transfer destination terminal device designating section enabling the user to designate the transfer destination terminal device, and can transmit the control information according to the designation in the transfer destination terminal device designating section.

According to a thirteenth aspect of the present invention, there is provided a configuration in which the user terminal device comprises a transfer destination terminal device selecting section which automatically selects the transfer destination terminal device, based on transfer destination terminal device selection information, and transmits the control information according to the selection in the transfer destination terminal device selecting section.

According to a fourteenth aspect of the present invention, the user terminal device can comprise a distance detection section detecting a distance to the transfer destination terminal device, and uses the detection result of the distance detection section as the transfer destination terminal device selection information.

According to a fifteenth aspect of the present invention, there is provided a configuration in which the user terminal device receives terminal-specific information which is sent from the transfer destination terminal device and relates to performance information of a network line with the proxy server and/or hardware information of the relevant transfer destination terminal device and uses the terminal-specific information as the transfer destination terminal device selection information.

Here, there may be employed a configuration in which the terminal-specific information is received via the proxy server.

According to a sixteenth aspect of the present invention, there can be provided a transfer destination terminal device in a similar communication system.

Namely, the transfer destination terminal device is characterized by being capable of outputting at least part of the service transferred from the proxy server device.

Similarly, according to a seventeenth aspect of the present invention, there is provided a configuration in which the transfer destination terminal device has a user management section which performs user management based on user authentication information transferred from the proxy server device and replies the authentication result to the proxy server device and/or the user terminal device.

According to an eighteenth aspect of the present invention, the transfer destination terminal device is characterized by comprising a terminal-specific information sending section which sends performance information of a network line of the relevant device with the proxy server and/or hardware information of the relevant device.

Finally, a proxy server device disclosed in a nineteenth aspect of the present invention is provided in the above-described communication system and characterized by functions of receiving the communication data while holding a session with the correspondent node and executes the application, and further transferring the service provided by the application, based on control information received from the user terminal device in such a manner that the transfer destination terminal device providing the service can be subjected to handoff.

According to a twentieth aspect of the present invention, the proxy server device has a configuration in which the service provided by the application can also be transferred to the user terminal device.

According to a twenty-first aspect of the present invention, there is disclosed a configuration in which the proxy server device has a user management section performing user management based on user authentication information received from the user terminal device.

According to a twenty-second aspect of the present invention, the proxy server device is characterized by comprising a user authentication transferring section which sends the user authentication information received from the user terminal device to the transfer destination terminal device to request user authentication and sends back the authentication result to the user terminal device.

According to a twenty-third aspect of the present invention, the proxy server device can comprise a terminal-specific information transferring section which receives the above-described terminal-specific information and transfers the terminal-specific information to the user terminal device.

BRIEF DESCRIPTION OF THE DRAWINGS

FIG. 8 shows an example of the transfer destination terminal selection information in the present embodiment.

DESCRIPTION OF THE PREFERRED EMBODIMENTS

Figure 1:
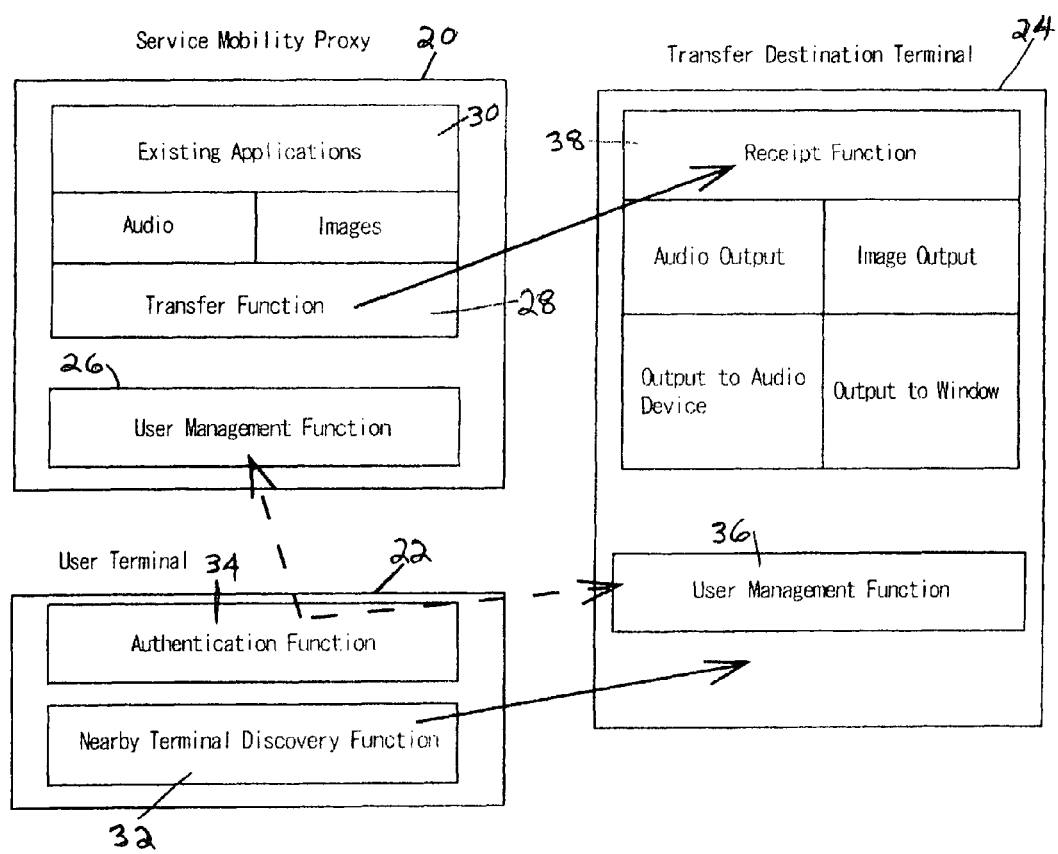
FIG. 1 shows a configuration example of a communication system using a service mobility proxy according to the present invention.

Hereinafter, the preferred methods of the present invention are described, illustrated in drawings. The embodiments of the present invention are not limited to the following, and can be modified as necessary.

The embodiments of the present invention are described based on the embodiments illustrated in the drawings. The embodiments can be modified as necessary as long as they are not departed from the gist of the present invention.

A communication system according to the present invention employs architecture using a service mobility proxy (a proxy server device) which smoothly performs handoff between heterogeneous terminals. In this architecture, all applications (processes) are executed on the service proxy, and only input and output of screens and audio of the applications and the like are transferred to an interface of a transfer destination terminal.

IP (Internet protocol) is used for transfer communication to the terminal. This enables the transfer to every equipment connected to the Internet, whether the transfer is performed through a wired terminal or a wireless terminal. In carrying out the present invention, any other protocol may be employed.

In an end-to-end type architecture, a correspondent node (hereinafter, referred to as CN) needs to be modified and thus, available applications are disadvantageously limited. However, in the architecture according to the present invention, the handoff between transfer destination terminals can be executed without modifying an existing application and an OS (operating system).

Furthermore, in this architecture, since the communication with an CN has been terminated by the service mobility proxy, the service handoff is enabled even in a terminal which does not have performance for executing applications or in a terminal which does not include an OS, such as a non personal computer, as long as a function of receiving and reproducing the transfer from the service mobility proxy is implemented.

Moreover, by performing the quality adjustment of images and audio in accordance with a transfer rate to the terminal on this service mobility proxy, optimal transfer can be also performed according to the performance, the communication band or the presence or absence of an interface of an available terminal at that time or the like, such as a transfer destination terminal capable of fast communication and a portable terminal connected through wireless communication.

FIG. 1 shows a configuration example of the communication system using the service mobility proxy 20 according to the present invention. As illustrated in FIG. 1, in addition to the service mobility proxy at 20, a user terminal 22 that a user can carry and a transfer destination terminal 24 which is a transfer destination to which a service is handed off are used to provide functions described in detail below.

The service mobility proxy 20 implements a user management function at 26, communication control function, and transfer function 28 of audio and screens in addition to an application execution function of executing communication data from a CN by an existing application at 30.

The user terminal has a service discovery function, nearby terminal discovery function at 32, function of authentication 34 to the service mobility proxy 20 and the transfer destination terminal at 24, and function of communication with the transfer destination terminal at 24.

The transfer destination terminal 24 implements a function of receiving 38 and reproducing video and audio transferred from the service mobility proxy at 20, function of communication with the user terminal at 22, function of authentication from the user terminal and function of authentication to the service mobility proxy at 20.

In order to implement the above-described functions, in the present embodiment, publicly known PCs can be used for the service mobility proxy 20 and the transfer destination terminal device at 24, respectively. These PCs each include a CPU controlling various types of processing, storage means such as a memory, external storage means such as a hard disk, input means such as a key board and a mouse, a display capable of displaying images/video, audio processing means for outputting audio (sound card)/speaker, and the like. Furthermore, a communication adapter necessary for connecting to wired LAN or wireless LAN can be provided.

The service mobility proxy 20 includes a user management section 26 which receives information of user authentication transmitted from the user terminal 22 through the communication adapter and checks it in the CPU against user management information stored in the storage means or the external storage means, and permits (authenticates) the connection when the information of the user authentication is appropriate. A variety of techniques such as communication encryption at such an authentication time are publicly known, which can be freely used in carrying out the present invention.

Furthermore, the CPU includes a communication control section which, by using received data which is received through the communication adapter from the CN, executes the existing application stored in the external storage means or the like, for example, video/audio reproduction software or the like and further performs the control of communication with another network equipment, such as protocol conversion and control of the communication adapter.

In the transfer destination terminal at 24, the data of video, audio or the like received through the communication adapter from the service mobility proxy 20 can be processed and reproduced in the CPU. Furthermore, the communication adapter can also have a function of communication with the user terminal. Furthermore, as in the foregoing, by the CPU and the storage means or the external storage means, the transfer destination terminal 24 can implement a user management section 36 in which the CPU and the external storage means link up to configure the authentication function from the user terminal 34 and the authentication function to the service mobility proxy.

Meanwhile, in the present embodiment, as the user terminal 22 is assumed to include a personal digital assistance (PDA) which has been increasingly sophisticated in recent years, a portable telephone terminal and a PHS terminal, some of which include almost similar configuration to that of PC. Specifically, it includes a CPU performing various types of processing, storage means such as a memory, a communication adapter realizing a communication function, and input means such as a keyboard and a touch panel, and further a display, audio processing means, speaker and the like. Depending on the types of the terminals, some of the above means are omitted and many of them have inferior performance as compared with a PC.

The user terminal 22 can discover a service provided from the service mobility proxy 20 by the operation of the CPU and the communication adapter. Specifically, although the user terminal 22 may not have the function of reproducing the provided service adequately, what service is provided, for example, types of application, the quality of the provided images/audio and the like can be obtained.

Furthermore, the CPU and the communication adapter has a function of discovering a nearby transfer destination terminal by utilizing a communication state and the like. The CPU sends the information of user authentication that a user inputs from the input means or the information of user authentication stored in the storage means, from the communication adapter to the service mobility proxy 20 or the transfer destination terminal 24.

The service executed by the application of the service mobility proxy 20 can be transferred with its execution screen captured, when transferred to the transfer destination terminal 24. Such a screen transfer technique is publicly known, which may be included as a standard function of an OS. Furthermore, in an OS having a window system in which a plurality of windows is displayed simultaneously on a screen, only the executed window of the relevant application can be transferred. Furthermore, the audio transfer may be realized by a method in which the audio is subjected to streaming reproduction in the transfer destination terminal, using a publicly known audio chatting function.

Figure 2:
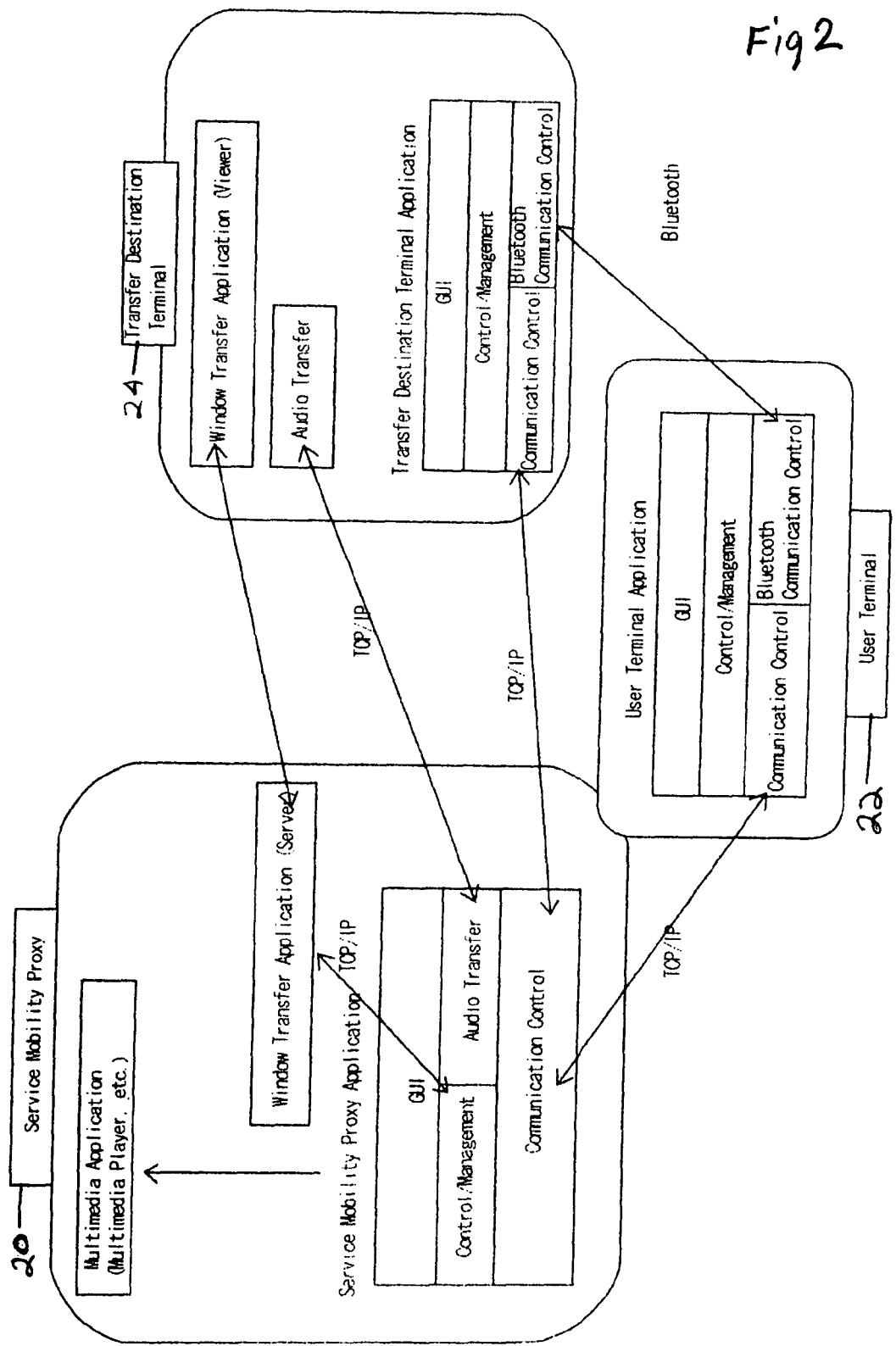
FIG. 2 is a process block diagram of the communication system.
Figure 3:
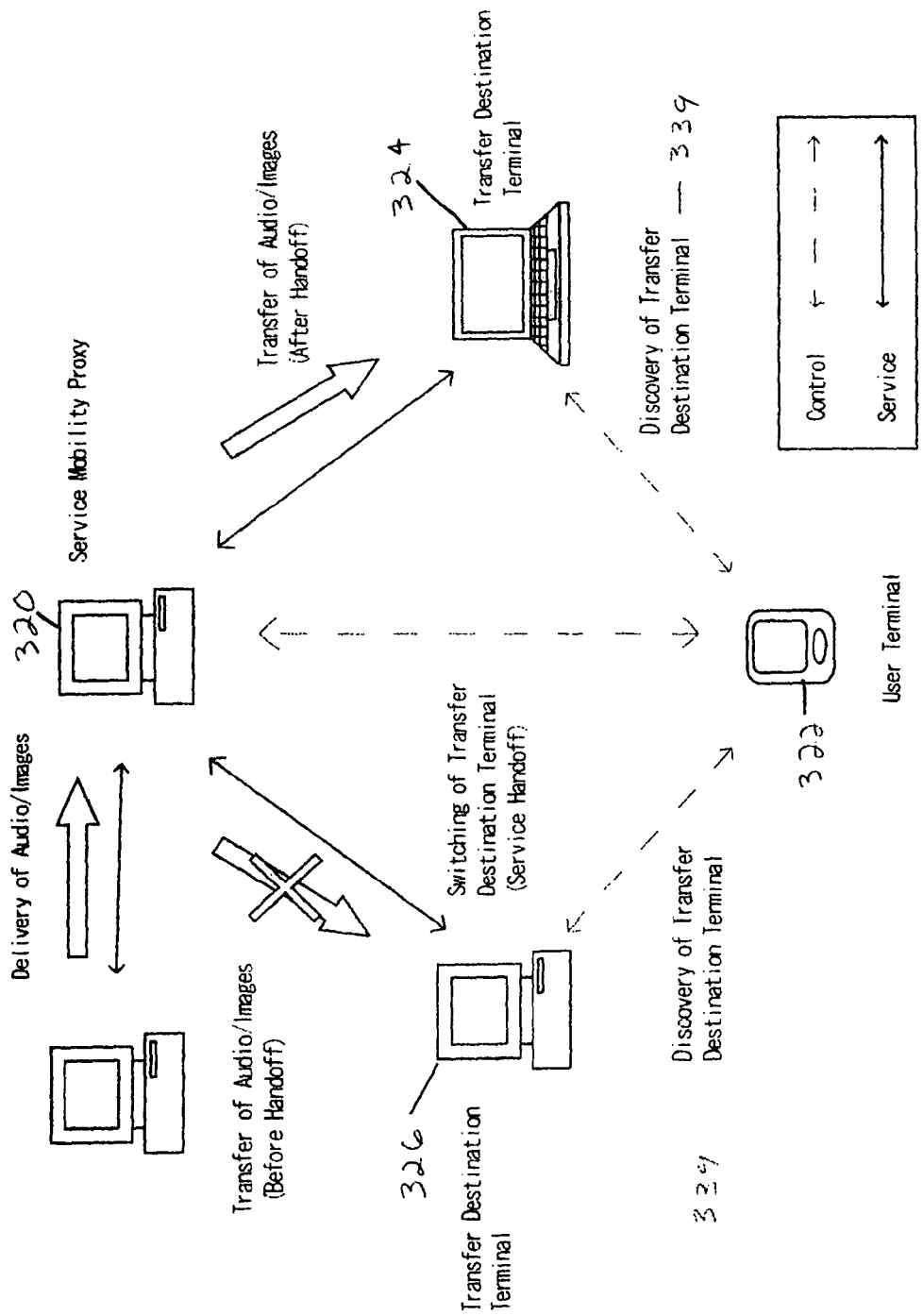
FIG. 3 is an explanatory view for explaining switching of respective devices.
Figure 4:
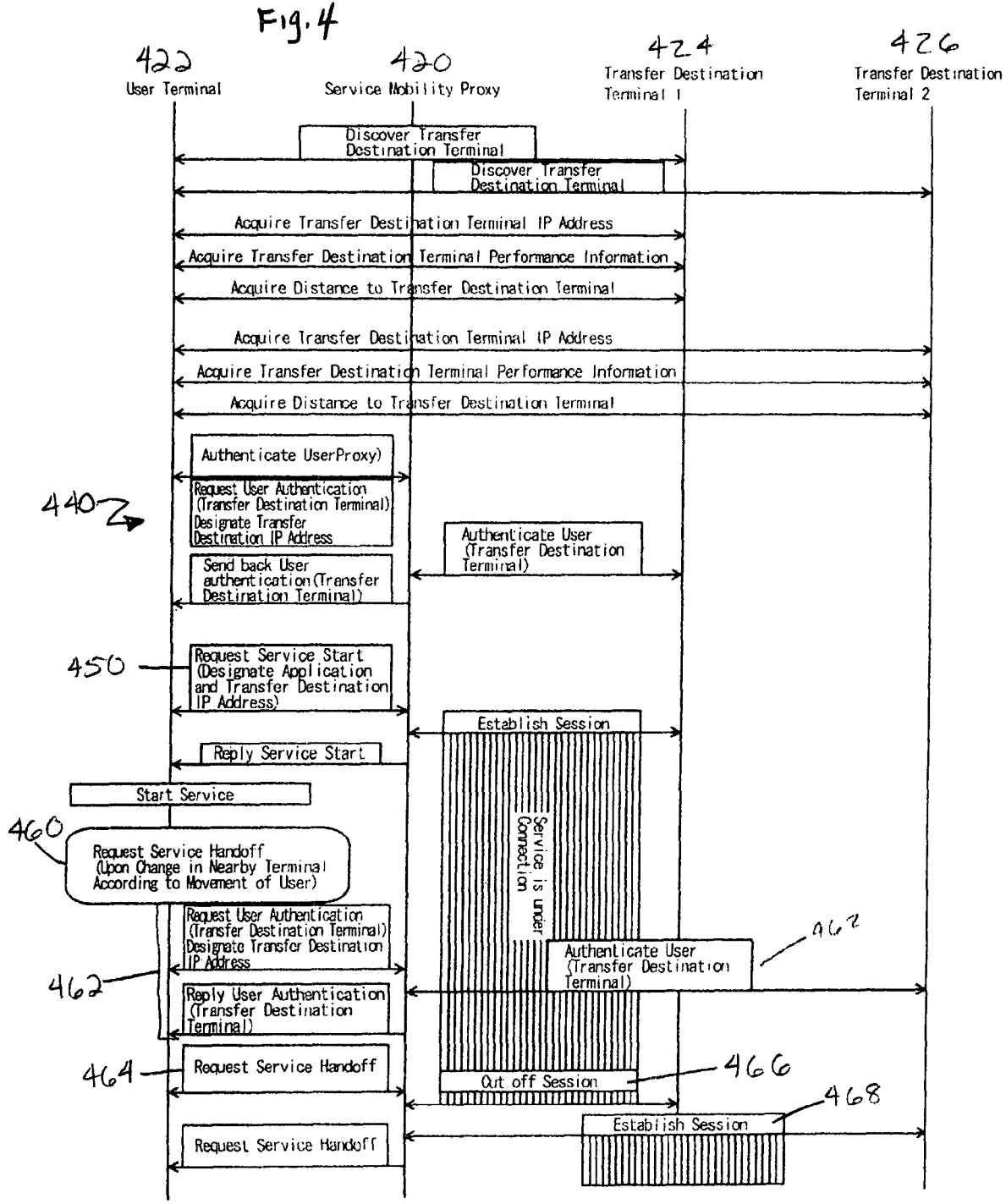
FIG. 4 shows a sequence of service handoff according to the present invention.

FIG. 2 is a process block diagram of the communication system when implementing the above-described functions, FIG. 3 is an explanatory view for explaining switching of the respective devices, and FIG. 4 shows a sequence of the service handoff according to the present invention, respectively.

First, a user terminal 22 discovers a nearby transfer destination terminal 24 capable of handoff between terminals, and acquires an IP address of the transfer destination, performance information, and distance information between the user terminal 22 and the transfer destination terminal 24. When a plurality of nearby transfer terminals are discovered 339, all the transfer destination terminals 324, 326 are subjected to the above-described processing.

By using a method described later, an optimal transfer destination terminal is selected from them, and the authentication 440 to the service mobility proxy 420 is first performed, and further, the authentication 440 from the proxy to a transfer destination terminal 1 at 424. When the authentication is completed, a service start request 450 is issued from the user terminal 422 to establish a session between the service mobility proxy 420 and the transfer destination terminal at 424.

The application executed on the service mobility proxy 420 is transferred to the transfer destination terminal 1 at 424.

Here, the execution of the application is performed by selecting the application which has been registered between the user terminal 422 and the proxy server 420 in advance. The service is started as described above, and then, the service handoff 460 to a transfer destination terminal 2 at 426 is executed upon change in distance between the user terminal 422 and the transfer destination terminal according to the movement of the user, a request from the user, change in terminal performance required by the communication service.

Again, at this time, the authentication 462 from the service mobility proxy 420 to the transfer destination terminal 2 at 426 is performed. When the authentication is completed, a service handoff request 464 is issued and the session with the transfer destination terminal 1 424 is cut off 466 to start a session 468 with the transfer destination terminal 2 at 426.

In the present invention, the communication system capable of service handoff is realized in the above-described sequence.

In the foregoing, while as a method for discovering a nearby transfer destination terminal, any communication method through the communication adapter can be used, in the present invention, the user terminal 422 and the transfer destination terminal 424, 426 include Bluetooth communication adapters to utilize a Bluetooth specification.

More specifically, terminal-specific information for each terminal, in particular performance information relating to the performance is acquired from each transfer destination terminal through the communication adapter, and at this time, a distance between the user terminal 422 and the transfer destination terminal 424,426 is estimated from a received signal intensity. The Bluetooth specification is considered to be used for communication at a comparatively short distance, and is preferable for the above-described requirement to discover a transfer destination terminal within a distance where the user can view and listen.

Figure 5:
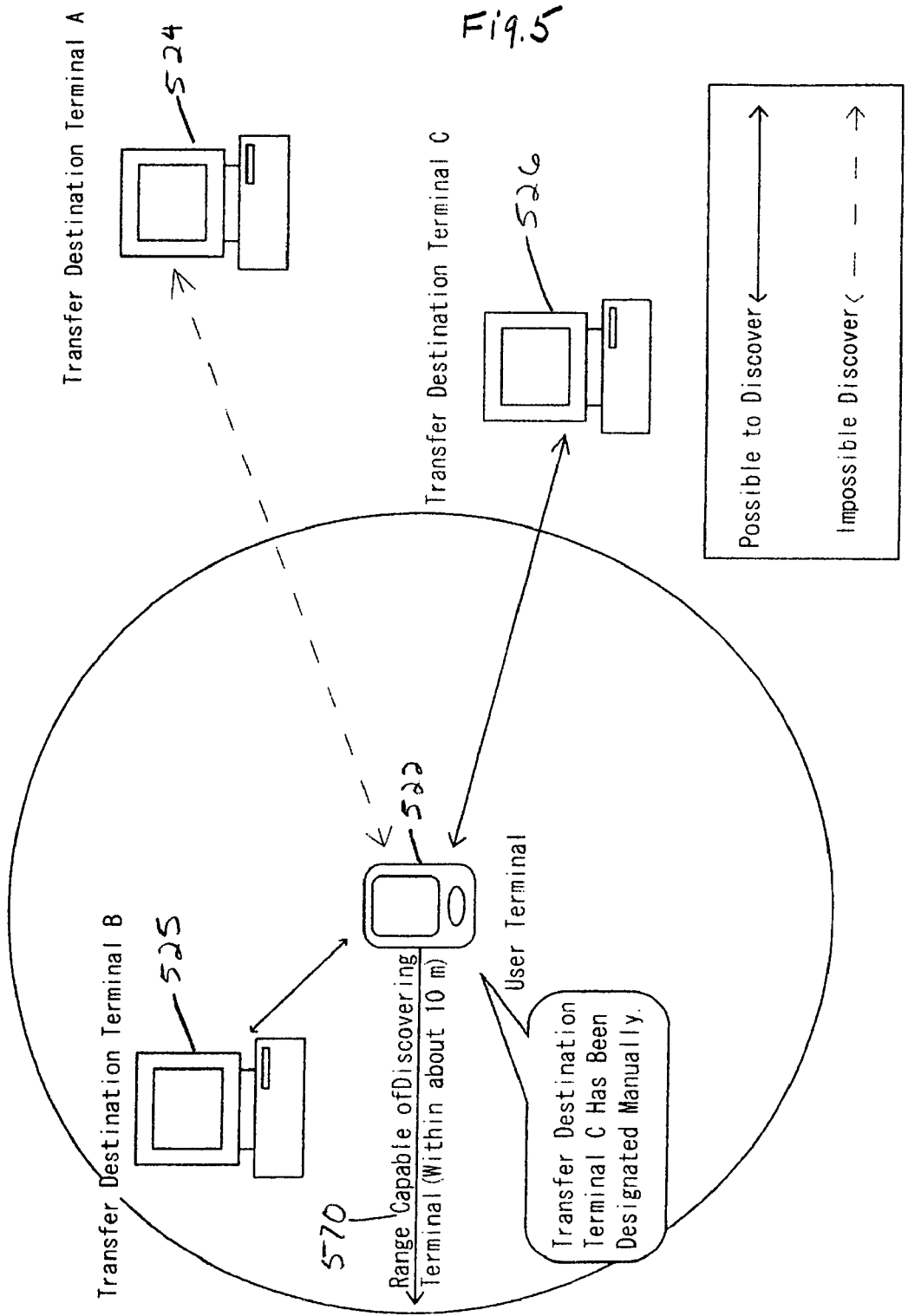
FIG. 5 is an explanatory view of a process for discovering a transfer destination terminal capable of handoff using Bluetooth.

As illustrated in FIG. 5, since in the Bluetooth specification, at present, there can be discovered a transfer destination terminal capable of handoff only within an about 10 m radius 570 from the user terminal 522, only a transfer destination terminal B 525 in the figure can be discovered within this 10 m radius 570.

Therefore, although a Bluetooth communication adapter basically needs to be implemented in each of the transfer destination terminals A and C, at 524 and 526, respectively, a transfer destination terminal not including the communication adapter can be put into a discovered state by registering it in the user terminal 522 by utilizing an SDP function. Thereby, even in a terminal which cannot implement the Bluetooth communication adapter for some reason and in environments where wireless communication is disabled, the communication system having the service handoff function of the present invention can be constructed.

In the above-described function of discovering a transfer destination terminal, transfer destination terminal searching may be periodically executed by the CPU of the user terminal at 522, or, for example, may be executed at the timing when the user instructs the searching from the input means of the user terminal.

In the case of a communication system in which, after establishing the communication in acquiring a distance to the transfer destination terminal, the communication adapter goes into a state in which the communication with other user terminals cannot be established, the transfer destination terminal performance information and the distance have been acquired from the transfer destination terminal and then, the CPU gives an instruction to automatically cut off the communication. Thereby, in a communication system using a plurality of user terminals simultaneously, the utilization from the other user terminals is enabled soon.

Figure 6:
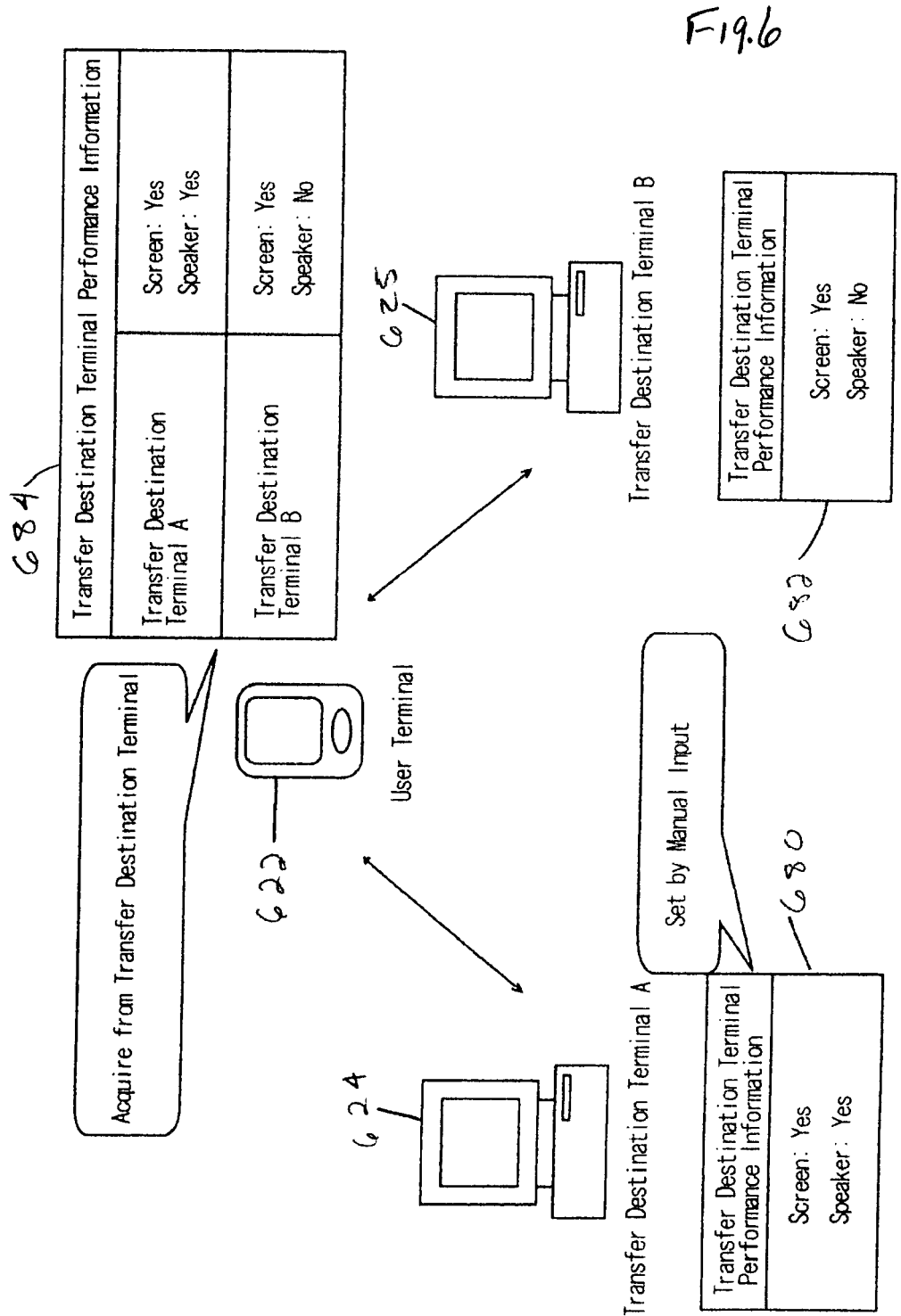
FIG. 6 shows an example relating to transfer destination terminal performance information.

Next, one example of the transfer destination terminal performance information is shown in FIG. 6. When performing the service handoff, the user designates a transfer destination terminal that the user prefers as a service handoff destination, and thus he or she needs to know the transfer destination terminal performance information. Therefore, the performance information is set in the transfer destination terminal in advance and stored, for example, in its external storage means or the like. In response to a request from the user terminal, the performance information is sent to the user terminal.

In FIG. 6, the information that a screen capable of displaying images/video is "present" and a speaker is also "present" is stored as its performance information 680 in the transfer destination terminal A 624 by hand in advance. Similarly, the information 682 that a screen is "present", but a speaker is "absent" is set in the transfer destination terminal B.

By the aforesaid discovery of the transfer destination terminal, the transfer destination terminals A 624 and B 625 are discovered, and then, the user terminal 622 acquires the performance information 684 of the respective transfer destination terminals.

In the present embodiment, the above-described transfer destination terminal performance information can be simultaneously set together with an IP addresses of the transfer destination terminals. More specifically, as shown in FIG. 7, in each of the transfer destination terminals, following an information type 790, the IP address of the relevant transfer destination terminal at 792, Y/N indicating the presence or absence of the screen at 794, Y/N indicating the presence or absence of the speaker are described sequentially 796.

Figure 7:
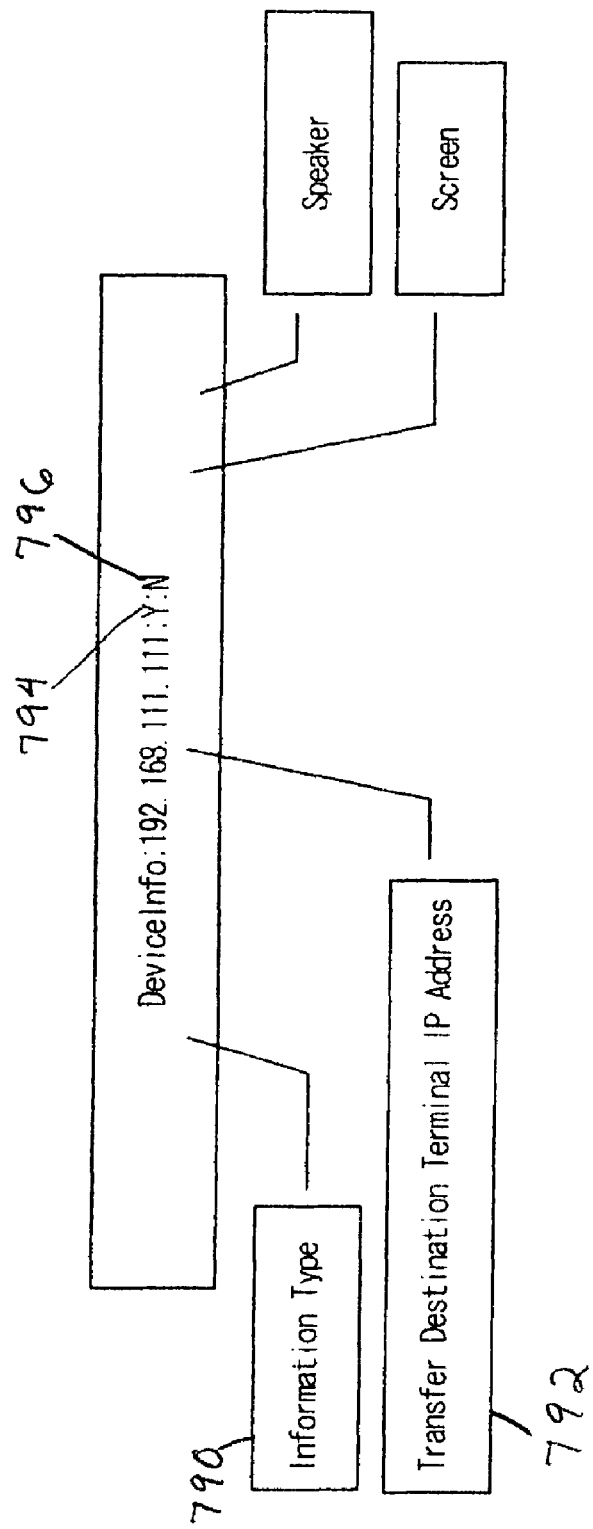
FIG. 7 shows an example of the transfer destination terminal performance information in the present embodiment.

Thereby, the user terminal receives the information in FIG. 7 through the Bluetooth communication adapter, and can acquire the IP address and the performance information in a character string starting from DeviceInfo.

In the present embodiment, while the transfer destination terminal performance information (terminal-specific information) is directly transmitted and received by the transfer destination terminal and the user terminal, a transfer section may be provided in the service mobility proxy to transfer the transfer destination terminal performance information.

Next, a description of the service handoff function which is a substantial part of the present invention is given. As described above, when reproducing communication data relating to images/audio or the like delivered from a CN, on a transfer destination terminal via the service mobility proxy, the service handoff function allows the reproduction to be continued by switching to another transfer destination terminal. While this switching can be performed upon designation by the user in the input means of the user terminal and in a transfer destination terminal device designating section included by the CPU, a transfer destination terminal selecting section of the CPU can also make automatic switching based on transfer destination terminal selection information included in the storage means of the user terminal.

The above-described transfer destination terminal selection information is shown in FIG. 8 at 8100. The information including the priorities of the selection with respect to the performance and the distance of the transfer destination terminal is preset in the user terminal. Referring to FIG. 8, as the transfer destination terminal selection information 8100, the distance between the user terminal and the relevant transfer destination terminal (terminal distance item) at 8102, the presence or absence of screen equipment (screen item) at 8104, and the presence or absence of speaker equipment (speaker item) 8106 are set.

For example, if the screen item 8104 is set as the first priority, the speaker item 8106 is set as the second priority, and the terminal distance item 8102 is set as the third priority, then based on the above-described transfer destination terminal performance information, a transfer destination terminal with screen equipment is first selected, and if there are a plurality of transfer destination terminals with screen equipment, a transfer destination terminal with speaker equipment is selected, and also if there are a plurality of transfer destination terminals with speaker equipment, a transfer destination terminal with a shorter terminal distance is selected.

Arbitrary items can be set as the above-described transfer destination terminal selection information (or the transfer destination terminal-specific information which is its origin) according to the contents of the service, and for example, the resolution of the screen and the number of displayed colors, screen size, display type such as liquid crystal, CRT and plasma, stereo or monaural reproduction of audio, number of simultaneous chords, speaker output, and the like are set, so that a transfer destination terminal capable of higher-performance reproduction can be selected. Furthermore, CPU performance of the transfer destination terminal, connection form to the Internet such as wired/wireless connection, line speed, connection type such as optical fiber/ADSL/public telephone line, communication fee may be set. In particular, since the information of line speed is extremely important for preferable reproduction and it is desirable to select a transfer destination terminal connected through a faster line, a higher priority may be advantageously given to the line speed.

Figure 9:
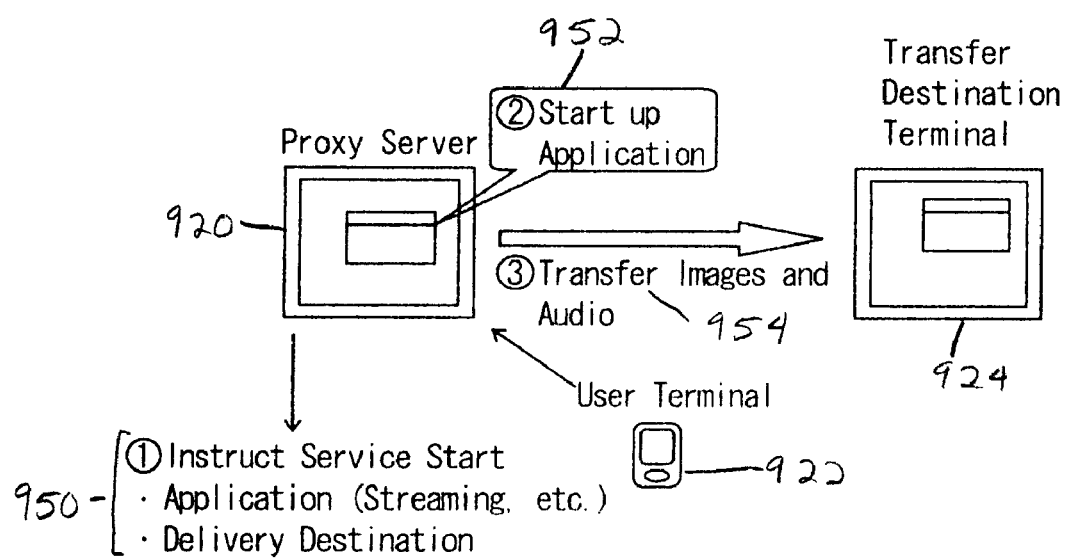
FIG. 9 is a process block diagram of the communication system at the time of service start.

Referring to a process block diagram of the communication system at the time of service start as shown in FIG. 9, a service start request is first made from the user terminal 922 to the service mobility proxy at 920. At this time, the service mobility proxy starts up an application 952 such as streaming to start the transfer of images, audio 954 and the like to the transfer destination terminal at 924.

The service start request 950 includes the IP address of the transfer destination terminal 924 together with the information for designating an application to be started up necessary for starting the service. A terminal name may be used in place of the IP address, and conversed by a name server.

The application that the user can start up is in advance selected from start-up applications preset in the service mobility proxy. For it, the start-up application 952 may be registered in the user terminal 922 in advance, or the information of the start-up application can also be acquired at arbitrary timing, for example, when setting the IP address of the service mobility proxy in the user terminal, or when transmitting the information of the user authentication.

After the service start request 950 is made from the user terminal at 922, the handoff can be automatically performed as described above with the movement of the user terminal, or manually performed in accordance with the user designation. As the timing of the automatic handoff, the CPU of the user terminal searches a transfer destination terminal at predetermined intervals, and every time a transfer destination terminal is newly discovered, the above described transfer destination terminal selecting section operates to make switching to an optimal transfer terminal.

Alternatively, either of the timing when the setting of manual handoff by the user is switched to the setting of automatic handoff or the timing when the above described transfer terminal selection information is updated by the user, or both of the timing may be employed.

Thereby, for example, in the case where the user judges from the service that audio output is important and gives the first priority to the speaker item in the transfer destination terminal selection information, the service handoff to a transfer destination terminal with speaker equipment can be automatically performed.

In the transfer of the images in the service mobility proxy 920, VNC (Virtual Network Computing) technique is utilized in the present embodiment. VNC is a technique which enables a desktop of a remote machine to be used from a machine at hand, and by which a window of the relevant application displayed in the service mobility proxy 920 is transferred to a transfer destination terminal at 924.

Furthermore, in the audio transfer, an audio input and output function that many OSs include as a standard function is used to acquire audio data, and DirectPlay (registered trademark) included in DirectX (registered trademark) is utilized to transfer the audio data with a real time audio chatting function. These techniques are known to those skilled in the art.

Figure 10:
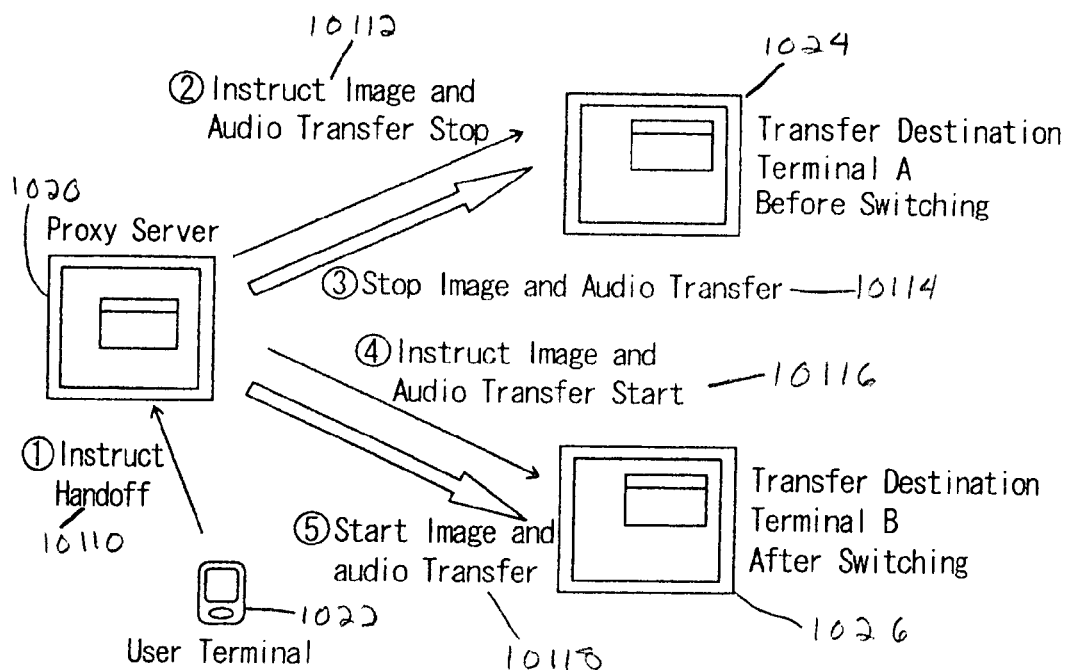
FIG. 10 is a process block diagram at the time of service handoff.

In FIG. 10, a process block diagram at the time of service handoff is shown. When a handoff instruction 10110 is given from the user terminal 1022 as described above, the service mobility proxy 1020 first gives a transfer stop instruction 10112 of images and audio to the transfer destination terminal A 1024 before switching to stop transferring the images and audio 10114 to the relevant transfer destination terminal A. Next, a transfer start instruction of the images and audio 10118 is given to the transfer destination terminal B 1026 after switching to start transferring the images and audio 10116.

Figure 11:
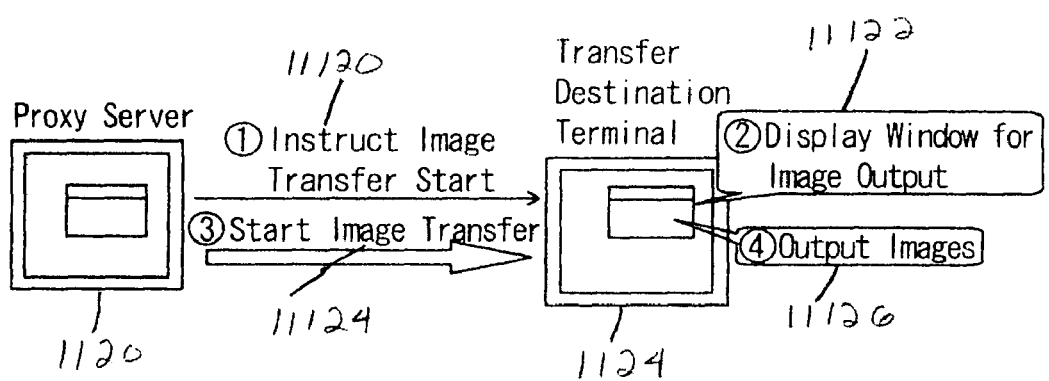
FIG. 11 is a process block diagram showing image transfer start.

The transfer start and stop of the image and audio at this time are described, referring to process block diagrams in FIGS. 11 to 14. In FIG. 11, when an image transfer start instruction 11120 is transmitted from the service mobility proxy at 1120, the transfer destination terminal 1124 displays a window for image output 11122 and then, upon starting the image transfer at 11124, the images are reproduced atm the window 11126.

Figure 12:
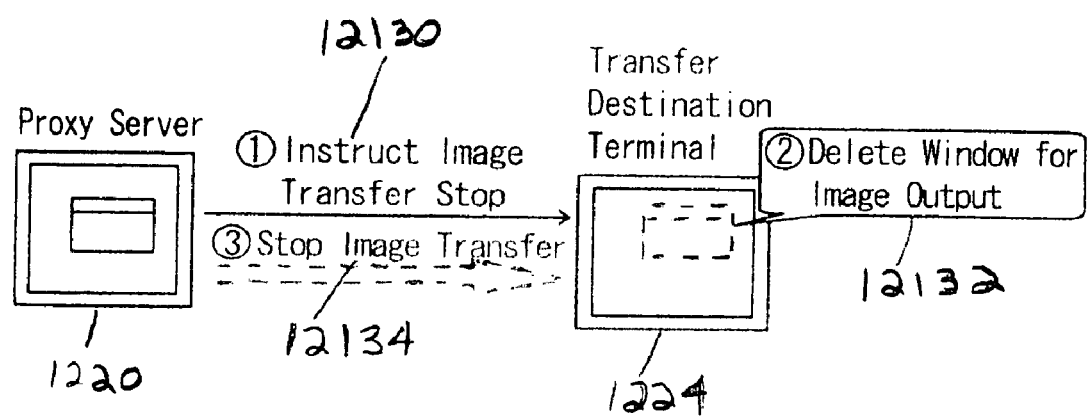
FIG. 12 is a process block diagram showing image transfer stop.

Furthermore, in FIG. 12, when an image transfer stop instruction 12130 is transmitted from the service Mobility proxy at 1220, the transfer destination terminal 1224 window is deleted 12132 to stop transferring subsequent images 12134.

Figure 13:
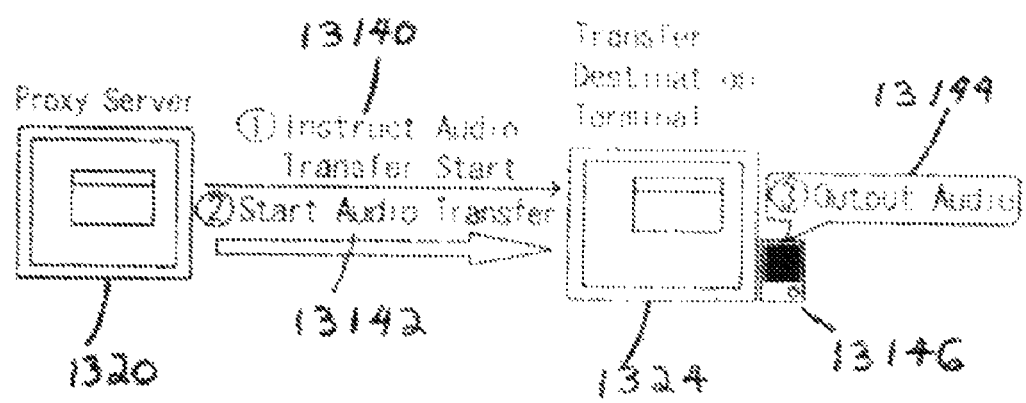
FIG. 13 is a process block diagram showing audio transfer start.

Moreover, in FIG. 13, when an audio transfer start instruction 13140 is transmitted from the service mobility proxy 1320 and then the audio transfer is started 13142, the audio is reproduced 13144 from the speaker equipment 13146 in the transfer destination terminal 1324.

Figure 14:
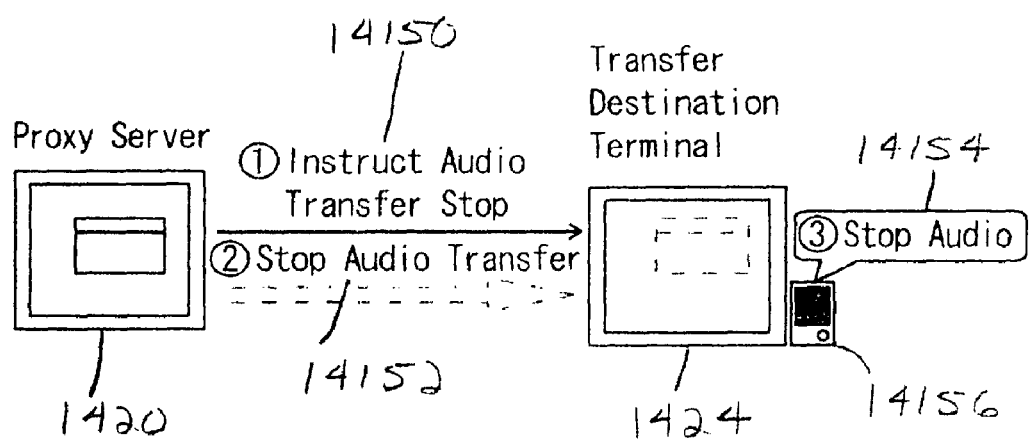
FIG. 14 is a process block diagram showing audio transfer stop.

Furthermore, in FIG. 14, when an audio transfer stop instruction 14150 is transmitted from the service mobility proxy at 1420, the subsequent audio transfer is stopped 14152 and the audio reproduction from the speaker equipment 14156 is also stopped 14154.

While the present invention includes the above-described configuration, with respect to the type of communication data delivered from the CN and the type of the service transmitted from the above-described service mobility proxy, services of any application are applicable without limiting them to images/audio.

Furthermore, instead of the configuration in which the screen on the service mobility proxy is transferred as it is, any data format in which videos and the like can be reproduced on the transfer destination terminal may be employed.

In the present invention, the service mobility proxy can include a function of obtaining the performance information of the transfer destination terminal from the user terminal to convert the service in accordance with the performance information. For example, in the case where a connected line speed of the transfer destination terminal is low, the conversion of the communication rate, conversion of image size, conversion of resolution of images and audio and bit rate and the like can be performed to enable optimal reproduction. These types of conversion processing can be carried out by publicly known techniques.

In the above-described embodiment, although the reproduction of services is not performed by the user terminal, the user terminal also has various means in addition to the CPU, and can receive the delivery from the service mobility proxy to reproduce services. For example, a user receives a service on the user terminal while moving and when the user arrives at a place where a transfer destination terminal is set up, the service may be handed off.

In the user terminal, optimal delivery can be received by the above-described conversions of the service.

The communication system of the present invention can include a plurality of service mobility proxies. In the case where the service mobility proxy is far on the network, a band capable of communication in the transfer to a transfer destination terminal is small, and a high-definition transfer utilizing a large-capacity communication or the like may be disabled. Therefore, a plurality of service mobility proxies are arranged, and the service mobility proxy existing near on the network is utilized in accordance with the location of the user terminal, so that the transfer with high performance kept in a place to which the user moves can be realized.

Furthermore, while a PC is used as the transfer destination terminal in the foregoing, the transfer to a device other than PC, which can be connected to an IP network, is possible. As long as the above-described functions necessary for a transfer destination terminal are implemented, the communication system of the present invention does not depend on the architecture of the device. Therefore, even a small device with a simple design or the like can be utilized as a destination of handoff between terminals.

The communication system according to the present invention has the above-described configuration, and the present invention is characterized in that there can be provided a communication system which, unlike the related art, requires no special application for a correspondent node and has a service handoff function enabling a transfer destination terminal device to be freely utilized, and its configuration equipment.

Hereinafter, the literatures cited as the present related art are shown.

Publicly Known Literature 1 T. Hodes and R. H. Katz, "Composable Ad hoc Location-based Services for Heterogeneous Mobile Clients," ACM Wireless Networks Journal, Special issue on mobile computing: Selected papers from MobiCom '97 Vol. 5, 1999.

Publicly Known Literature 2 Kaneko Kunitake, Morikawa Hiroyuki, Aoyama Tomonari and Nakayama Masaya, "End-to-End Type Mobility Support in Diversifying Internet Environments," Technical Report of The Institute of Electronics, Information and Communication Engineers, MoMuC 2002-8, pp. 45-50, 2002; Kaneko Kunitake, Kawachi Yuusuke, Morikawa Hiroyuki, Aoyama Tomonori and Nakayama Masaya, "Implementation and Evaluation of End-to-End Type Mobility Support in Session Layer," Technical Report of The Institute of Electronics, Information and Communication Engineers, MoMuc 2002-9, pp. 51-56, 2002.

Publicly Known Literature 3 Ohta Ken, Nakagawa Tomohiro, Isoda Yoshinori and Sugimura Toshiaki, "Environment-Adaptive Mobile Terminal Architecture for Realizing Seamless Service" Symposium on Multimedia, Distributed, Cooperative and Mobile Systems (DICOMO 2001), pp. 301-306, 2001.

Publicly Known Literature 4 B. Brumitt, B. Meyers, J. Krumm, A. Kern and S. Shafer, "Easyliving: Technologies for Ingelligent Environment," Handheld and Ubiquitous Computing, pp. 12-29, 2000.

Publicly Known Literature 5 Katayama Minoru, Takasugi Kouichi, Kubota Minoru and Kogiku Ichizo, "Realizing Method of Continuity of Service between Heterogeneous Networks" Journal of The Institute of Electronics, Information and Communication engineers, Vol. J84-B, No. 3, pp. 452-460, 2001.

Publicly Known Literature 6 D. A. Maltz and P. Bhagwat, "MSOCKS: An Architecture for Transport Layer Mobility," INFOCOM, pp. 1037-1045, 1998.

Publicly Known Literature 7 M. Roussopoulos, P. Maniatis, E. Swierk. K. Lai, G. Appenzeller and M. Baker, "Person-Level Routing in the Mobile People Architecture," Proc. Of USITS '99: The $2^{nd}$ USENIX Symposium on Internet Technologies & Systems, 1999.

Publicly Known Literature 8 B. Raman, R. H. Katz and A. D. Joseph, "Universal Inbox: Providing Extensible Personal Mobility and Service Mobility in an Integrated Communication Network," Workshop on Mobile Computing Systems and Applications (WMSCA '00), 2000.

Publicly Known Literature 9 http://www.microsoft.com/japan/msdn/directx/techart/dp8ovrview.asp

What is claimed is:

1. A communication system having a service handoff function, in which in accordance with control information from a user terminal device, a service can be received while being handed off to a desired transfer destination terminal device, the communication system comprising:
   a correspondent node delivering communication data which can be executed by a predetermined application;
   a proxy server device which receives the communication data while holding a session with the correspondent node and executes the application, and further transfers the service provided by the application to the transfer destination terminal device;
   the transfer destination terminal device capable of outputting at least part of the service transferred from the proxy server device; and
   the user terminal device which can be carried by a user, wherein the user terminal device prepares control information;
   wherein each transfer destination terminal device comprises a terminal specific information transmission unit for transmitting the control information; and
   wherein the user terminal device transmits the control information to the proxy server device, and based on the control information, the proxy server device selects the most effective protocol, switches the transfer destination terminal device, providing the service to perform service handoff to the selected protocol;
   wherein the user terminal device comprises a transfer destination terminal device selecting section which automatically selects the transfer destination terminal device, based on transfer destination terminal device selection information, and transmits the control information according to the selection in the transfer destination terminal device selecting section;
   wherein the user terminal device comprises a distance detection section detecting a distance to the transfer destination terminal device, and uses the detection result of the distance detection section as the transfer destination terminal device selection information;
   wherein the transfer destination terminal device comprises a terminal-specific information sending section which sends performance information of a network line of a relevant device with the proxy server and/or hardware information of the relevant device; and the user terminal device receives the terminal-specific information from the terminal-specific information sending section, and uses the terminal-specific information as the transfer destination terminal device selection information.

2. The communication system having a service handoff function according to claim 1,
   wherein the proxy server device can also transfer the service provided by the application to the user terminal device; and
   the user terminal device can output at least part of the service transferred from the proxy server device.

3. The communication system having a service handoff function according to claim 1,
   wherein the user terminal device comprises a user authentication section transmitting user authentication information; and
   the proxy server device has a user management section performing user management based on the user authentication information.

4. The communication system having a service handoff function according to claim 1,
   wherein the user terminal device comprises the user authentication section transmitting the user authentication information;
   the proxy server device comprises a user authentication transfer section which sends the user authentication information to the transfer destination terminal device to request user authentication, and sends back the authentication result to the user terminal device; and
   the transfer destination terminal device has a user management section which performs user management based on the user authentication information, and replies the authentication result to the proxy server device.

5. The communication system having a service handoff function according to claim 1, wherein the user terminal device comprises a transfer destination terminal device designating section enabling the user to designate the transfer destination terminal device, and transmits the control information according to the designation in the transfer destination terminal device designating section.

6. A user terminal device which is provided in a communication system comprising a correspondent node delivering communication data which can be executed by a predetermined application, a proxy server device which receives the communication data while holding a session with the correspondent node and executes the application, and further transfers a service provided by the application to a transfer destination terminal device, and the transfer destination terminal device capable of outputting at least part of the service transferred from the proxy server device, wherein the user terminal device comprises a control information transmitting section which transmits to the proxy server device control information for allowing the proxy server device to switch the transfer destination terminal device providing the service and perform service handoff;

wherein the user terminal device prepares control information;

and wherein the user terminal device transmits the control information to the proxy server device, and based on the control information, the proxy server device selects the most effective protocol, switches the transfer destination terminal device, providing the service to perform service handoff to the selected protocol;

wherein the user terminal device comprises a transfer destination terminal device selecting section which automatically selects the transfer destination terminal device, based on transfer destination terminal device selection information, and transmits the control information according to the selection in the transfer destination terminal device selecting section;

wherein the user terminal device comprises a distance detection section detecting a distance to the transfer destination terminal device, and uses the detection result of the distance detection section as the transfer destination terminal device selection information;

wherein the transfer destination terminal device comprises a terminal-specific information sending section for transmitting the control information and which sends performance information of a network line of a relevant device with the proxy server and/or hardware information of the relevant device; and the user terminal device receives the terminal-specific information from the terminal-specific information sending section, and uses the terminal-specific information as the transfer destination terminal device selection information.

7. The user terminal device according to claim 6, having a configuration capable of outputting at least part of the service transferred from the proxy server device.

8. The user terminal device according to claim 6, comprising a user authentication section transmitting user authentication information.

9. The user terminal device according to claim 6, wherein the user terminal device comprises a transfer destination terminal device designating section enabling the user to designate the transfer destination terminal device, and transmits the control information according to the designation in the transfer destination terminal device designating section.

10. A transfer destination terminal device which is provided in a communication system comprising a correspondent node delivering communication data which can be executed by a predetermined application, a proxy server device which receives the communication data while holding a session with the correspondent node and executes the application, and further transfers a service provided by the application to a transfer destination terminal device, and a user terminal device which can be carried by a user, wherein the user terminal device prepares control information;

wherein the transfer destination terminal device is capable of outputting at least part of the service transferred from the proxy server device;

and wherein the user terminal device transmits the control information to the proxy server device, and based on the control information, the proxy server device selects the most effective protocol, switches the transfer destination terminal device, providing the service to perform service handoff to the selected protocol;

wherein the user terminal device comprises a transfer destination terminal device selecting section which automatically selects the transfer destination terminal device, based on transfer destination terminal device selection information, and transmits the control information according to the selection in the transfer destination terminal device selecting section;

wherein the user terminal device comprises a distance detection section detecting a distance to the transfer destination terminal device, and uses the detection result of the distance detection section as the transfer destination terminal device selection information;

wherein the transfer destination terminal device comprises a terminal-specific information sending section for transmitting the control information and which sends performance information of a network line of the relevant device with the proxy server and/or hardware information of a relevant device; and the user terminal device receives the terminal-specific information from the terminal-specific information sending section, and uses the terminal-specific information as the transfer destination terminal device selection information.

11. The transfer destination terminal device according to claim 10, wherein the transfer destination terminal device has a user management section which performs user management based on user authentication information transferred from the proxy server device and replies the authentication result to the proxy server device and/or the user terminal device.

12. A proxy server device which is provided in a communication system comprising a correspondent node delivering communication data which can be executed by a predetermined application, a transfer destination terminal device capable of outputting at least part of the service transferred from the proxy server device, and a user terminal device which can be carried by a user, wherein the proxy server device has functions of: receiving the communication data while holding a session with the correspondent node and executes the application; and transferring the service provided by the application using the most effective protocol, based on control information received from a user terminal device in such a manner that the transfer destination terminal device providing the service that can be subjected to handoff;

a user terminal device which can be carried by a user, wherein the user terminal device prepares the control information;

wherein the transfer destination terminal device is capable of outputting at least part of the service transferred from the proxy server device;

the proxy server device selects the most effective protocol, switches the transfer destination terminal device, providing the service to perform service handoff to the selected protocol;

wherein the user terminal device comprises a transfer destination terminal device selecting section which automatically selects the transfer destination terminal device, based on transfer destination terminal device selection information, and transmits the control information according to the selection in the transfer destination terminal device selecting section;

wherein the user terminal device comprises a distance detection section detecting a distance to the transfer destination terminal device, and uses the detection result of the distance detection section as the transfer destination terminal device selection information;

wherein the transfer destination terminal device comprises a terminal-specific information sending section for transmitting the control information and which sends performance information of a network line of the relevant device with the proxy server and/or hardware information of a relevant device; and the user terminal device receives the terminal-specific information from the terminal-specific information sending section, and uses the terminal-specific information as the transfer destination terminal device selection information.

13. The proxy server device according to claim 12, having a configuration in which the service provided by the application can also be transferred to the user terminal device.

14. The proxy server device according to claim 12, having a user management section performing user management based on user authentication information received from the user terminal device.

15. The proxy server device according to claim 12, comprising a user authentication transferring section which sends the user authentication information received from the user terminal device to the transfer destination terminal device to request user authentication and sends back the authentication result to the user terminal device.

16. The system of claim 1, 6, 10, or 12, wherein the control information comprises data pertaining to the network line efficiency.

17. The system of claim 1, 6, 10, or 12, wherein the control information comprises hardware data.

* * * * *